United States Patent
Gross et al.

(10) Patent No.: US 10,248,403 B2
(45) Date of Patent: Apr. 2, 2019

(54) PROVIDING UPDATES FOR NATIVELY RENDERED MOBILE APPLICATIONS

(71) Applicant: Kony, Inc., Orlando, FL (US)

(72) Inventors: Edward Gross, Orlando, FL (US); Kadali V. Giri, Telangana (IN); Destry Gustin, Oviedo, FL (US); Bjorn Hildahl, Orlando, FL (US); Komandur Rajendra Kumar, Hyderabad (IN); Matthew B. Trevathan, Roswell, GA (US)

(73) Assignee: KONY, INC., Orlando, FL (US)

( * ) Notice: Subject to any disclaimer, the term of this patent is extended or adjusted under 35 U.S.C. 154(b) by 535 days.

(21) Appl. No.: 14/657,153

(22) Filed: Mar. 13, 2015

(65) Prior Publication Data

US 2016/0266889 A1 Sep. 15, 2016

(51) Int. Cl.
*G06F 9/44* (2018.01)
*G06F 8/65* (2018.01)
*H04L 29/08* (2006.01)

(52) U.S. Cl.
CPC ............ *G06F 8/65* (2013.01); *H04L 67/02* (2013.01); *H04L 67/10* (2013.01); *H04L 67/125* (2013.01); *H04L 67/34* (2013.01); *H04L 67/2823* (2013.01)

(58) Field of Classification Search
None
See application file for complete search history.

(56) References Cited

U.S. PATENT DOCUMENTS

| | | | | |
|---|---|---|---|---|
| 7,877,461 B1 * | 1/2011 | Rimmer | .............. | H04L 63/0823 709/203 |
| 8,726,264 B1 * | 5/2014 | Allen | ........................ | G06F 8/68 717/168 |
| 8,898,630 B2 * | 11/2014 | Hirsch | ........................ | G06F 9/44 717/107 |
| 8,978,006 B2 * | 3/2015 | Hirsch | ........................ | G06F 8/71 717/107 |
| 9,134,964 B2 * | 9/2015 | Hirsch | ........................ | G06F 8/30 |
| 9,430,641 B1 * | 8/2016 | Marion | .................... | G06F 21/53 |
| 9,448,776 B1 * | 9/2016 | Sankaran | ........... | G06F 17/30893 |

(Continued)

OTHER PUBLICATIONS

PhoneGap, http://phonegap.com/about/, copyright 2015, accessed in 2014; 3 pages.

(Continued)

*Primary Examiner* — Insun Kang
(74) *Attorney, Agent, or Firm* — Andrew M. Calderon; Roberts Mlotkowski Safran Cole & Calderon, P.C.

(57) ABSTRACT

Systems and methods for providing an update to a natively rendered application installed on a mobile device are provided. A method includes sending a message to a server, wherein the message includes identifying information about the application. The method also includes receiving an update from the server in response to the message, wherein the update comprises a module of code that corresponds to less than the entire application. The method further includes updating the application using the received update. The method additionally includes executing the application after the updating. The method also includes, based on the executing the application, natively rendering the application using the operating system of the mobile device.

21 Claims, 4 Drawing Sheets

(56) References Cited

U.S. PATENT DOCUMENTS

| | | | |
|---|---|---|---|
| 2002/0165961 A1* | 11/2002 | Everdell | H04L 41/22 709/225 |
| 2003/0182414 A1* | 9/2003 | O'Neill | G06F 8/65 709/223 |
| 2004/0031030 A1* | 2/2004 | Kidder | G06F 1/14 717/172 |
| 2004/0255291 A1* | 12/2004 | Sierer | G06F 8/61 717/174 |
| 2005/0132350 A1* | 6/2005 | Markley | G06F 8/65 717/168 |
| 2006/0010435 A1* | 1/2006 | Jhanwar | G06F 8/65 717/168 |
| 2006/0048134 A1* | 3/2006 | Napier | G06F 8/65 717/169 |
| 2008/0201705 A1* | 8/2008 | Wookey | G06F 8/68 717/175 |
| 2009/0133014 A1* | 5/2009 | Laurila | G06F 8/60 717/174 |
| 2009/0271777 A1* | 10/2009 | Tow | G06F 8/65 717/171 |
| 2010/0087181 A1* | 4/2010 | Chen | G06F 8/65 455/418 |
| 2010/0251230 A1* | 9/2010 | O'Farrell | G06F 17/30575 717/173 |
| 2010/0262959 A1* | 10/2010 | Bruno | G06F 21/6209 717/171 |
| 2010/0281475 A1* | 11/2010 | Jain | G06F 8/68 717/172 |
| 2010/0325622 A1* | 12/2010 | Morton | G06F 8/68 717/168 |
| 2011/0321028 A1* | 12/2011 | Evans | G06F 8/68 717/170 |
| 2012/0102485 A1* | 4/2012 | Goldman | G06F 9/44526 717/176 |
| 2012/0159310 A1 | 7/2012 | Chang et al. | |
| 2013/0007723 A1* | 1/2013 | Choudhary | G06F 8/65 717/170 |
| 2013/0019237 A1* | 1/2013 | Pardehpoosh | G06Q 30/0609 717/171 |
| 2013/0111461 A1* | 5/2013 | Zubas | G06F 8/665 717/173 |
| 2014/0040871 A1* | 2/2014 | Schwan | G06F 8/71 717/141 |
| 2014/0047428 A1* | 2/2014 | Prakash | G06F 21/572 717/168 |
| 2014/0047517 A1* | 2/2014 | Ding | H04L 12/1453 726/5 |
| 2014/0068549 A1* | 3/2014 | Friedman | G06F 8/30 717/104 |
| 2014/0068595 A1* | 3/2014 | Belinsky | G06F 8/65 717/173 |
| 2014/0109046 A1* | 4/2014 | Hirsch | G06F 9/44 717/120 |
| 2014/0109115 A1* | 4/2014 | Low | G06F 9/541 719/328 |
| 2014/0136945 A1 | 5/2014 | Ligman et al. | |
| 2014/0164944 A1* | 6/2014 | Sivakumar | G06F 17/30905 715/746 |
| 2014/0223423 A1* | 8/2014 | Alsina | G06F 8/65 717/173 |
| 2014/0244488 A1* | 8/2014 | Kim | G06Q 20/123 705/39 |
| 2014/0281863 A1* | 9/2014 | Burckart | G06F 17/2235 715/208 |
| 2014/0282032 A1* | 9/2014 | Brown | G06F 3/0484 715/738 |
| 2014/0317482 A1* | 10/2014 | Sun | G06F 17/2235 715/205 |
| 2015/0007155 A1* | 1/2015 | Hoffman | G06F 8/65 717/168 |
| 2015/0019944 A1* | 1/2015 | Kalgi | G06Q 20/227 715/205 |
| 2015/0067641 A1* | 3/2015 | Nyisztor | H04L 41/082 717/121 |
| 2015/0100954 A1* | 4/2015 | Sievers | G06F 8/65 717/170 |
| 2015/0199213 A1* | 7/2015 | Desai | H04L 67/306 718/102 |
| 2016/0188317 A1* | 6/2016 | Hilliar | G06F 8/65 717/172 |
| 2016/0202960 A1* | 7/2016 | Minh Le | G06F 11/3624 717/158 |
| 2016/0253170 A1* | 9/2016 | Fardig | G06F 8/68 717/170 |
| 2017/0102928 A1* | 4/2017 | Cooper | G06F 9/541 |
| 2017/0102935 A1* | 4/2017 | Xi | G06F 8/65 |
| 2017/0118037 A1* | 4/2017 | Kitchen | H04L 12/2818 |

OTHER PUBLICATIONS

PhoneGap, http://phonegap.com/about/faq/, copyright 2015, accessed in 2014; 2 pages.

U.S. Appl. No. 14/506,112, filed Oct. 3, 2014; 64 pages.

* cited by examiner

PROVIDING UPDATES FOR NATIVELY RENDERED MOBILE APPLICATIONS

FIELD OF THE INVENTION

The invention relates to mobile applications and, more particularly, to systems and processes for providing updates for natively rendered mobile applications.

BACKGROUND OF THE INVENTION

Mobile applications (applications) are generally classified as one of native, web, and hybrid. A native application is written in a native programming language for a specific mobile device platform and is executable only on the particular operating system (e.g., iOS, ANDROID, WINDOWS, etc.) associated with the platform. A native application can access the available Application Programming Interface (APIs) of the particular operating system (OS) and can access the mobile device's native platform features (e.g., camera, compass, GPS, etc.). However, a native application written for one mobile platform cannot be used on another, different mobile platform.

A web application is written in a web content language (e.g., HTML5, CSS3, JAVASCRIPT) and is accessed through the mobile device's web browser. Specifically, a web application runs within the mobile device's web browser instead of being executed directly by the OS. In this manner, a web application may be deployed to and run on different mobile device platforms. A hybrid application is built using web application content (e.g., HTML5, CSS3, JAVASCRIPT) that is wrapped in a platform specific container that provides limited access to native platform features.

It is common for a mobile application to be updated after it has initially been installed on a mobile device. An update may occur, for example, when the developer of the application makes a change to the user interface (UI) and/or logic within the code of the application. Updating a natively rendered application, though, requires the developer to update the entire application, and requires the user to download the entire updated application (e.g., from an app store) and re-install the updated application on their device. Essentially, the update is a complete, stand-alone application that takes the place of the previously installed application. In some cases, updating a native application can be a large operation since the entire application must be updated, downloaded, and re-installed. Moreover, the developer must update the different native applications for each different platform, which can also be very time consuming.

Developers that leverage hybrid applications (e.g., PHONEGAP, etc.) can create updates and send the updated code (e.g., HTML5, CSS3, JAVASCRIPT) to the mobile device via web server. For example, hybrid application developers can create an application that can be updated via an HTML5 manifest file across multiple platforms. An advantage of hybrid applications is that a developer can perform a user experience (UX) update on the device in a simpler manner than is required for updating native applications. However, a disadvantage of hybrid applications is that they lack the native UX preferred by end users of the mobile devices. Specifically, a hybrid application is not rendered natively; instead, a hybrid application relies on HTML5 and CSS to do the styling, and this type of rendering is not as flashy, smooth, or consistent as a natively rendered application.

Hence there exists a problem in that end users prefer the UX provided by a natively rendered application compared to that of a hybrid application, but updating a native application is more time consuming (for both the developer and the end user) than updating a hybrid application. Further, there exists a problem that native applications cannot be built in a modular fashion to quickly enable and disable features without applying an update to an app store, which requires a full update of the native application.

In-application purchases (also called in-app purchases) are another area in which natively rendered applications suffer from a lack of modularity. An in-app purchase is a way for a user to access special content or features in the application. Typically, the user provides payment to the application owner, and the application owner unlocks the special content or features in the application on the user's device. For native applications, the logic that defines the special content or features is contained (i.e., pre-installed) in the application when the application is initially downloaded and installed on the mobile device, and is merely unlocked (made available to the user) when the user makes the in-app purchase. This disadvantageously bloats the size of applications since the applications are pre-configured to contain in-app purchase logic that may not ever be purchased by the user.

SUMMARY OF THE INVENTION

In a first aspect of the invention, there is a method of providing an update to a natively rendered application installed on a mobile device. The method includes sending a message to a server, wherein the message includes identifying information about the application. The method also includes receiving an update from the server in response to the message, wherein the update comprises a module of code that corresponds to less than the entire application. The method further includes updating the application using the received update. The method additionally includes executing the application after the updating. The method also includes, based on the executing the application, natively rendering the application using the operating system of the mobile device.

In another aspect of the invention, there is a method of providing an update to a natively rendered application installed on a mobile device. The method includes transmitting an application and an application shell associated with the application to a mobile device, wherein the application shell is configured to cause the mobile device to: send a message to a server, wherein the message includes identifying information about the application; receive an update from the server in response to the message, wherein the update comprises a module of code that includes layout data and/or instructional logic that is used in executing the application; update the application using the received update, wherein the updating comprises overwriting a subset of code of the application with the code of the module without replacing the entire application; execute the application after the updating; and based on the executing the application, natively render the application using the operating system of the mobile device. The application and the update are composed of code in a language different from a native language of the operating system. The application shell comprises code in a native language of the operating system.

In yet another aspect of the invention, there is a computer system for providing an update to a natively rendered application installed on a mobile device. The computer system includes a server that is structured and arranged to: store an application and an application shell associated with the application; transmit the application and the application shell to a mobile device; receive a message from the mobile device, the message including identifying information about the application; determine, based on the message, an update for the application; and transmit the update to the mobile device. The update comprises a module of code that includes layout data and/or instructional logic that is used in executing the application on the mobile device. The application and the update are composed of code in a language different from a native language of the operating system of the mobile device. The application shell comprises code in a native language of the operating system of the mobile device. The application shell causes the application to be natively rendered by the operating system of the mobile device. The application shell overwrites a subset of code of the application with the code of the module without replacing the entire application.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to mobile applications and, more particularly, to systems and processes for providing updates for natively rendered mobile applications. According to aspects of the invention, updates for natively rendered mobile applications are provided in a modular manner, i.e., without requiring a download of the complete application from an app store. This aspect of the invention advantageously reduces the file size and install time of updates to an already installed application. According to aspects of the invention, code for in-app purchases is provided in a modular manner, i.e., without including the code of the in-app purchase in the initial application download. This aspect of the invention advantageously reduces the file size and install time of the initial application download. Embodiments of the invention utilize an application shell and a virtual machine to interpret both the layout and logic of a mobile application, such that the application is rendered natively on the mobile device. In this manner, updates to the application (including initialization updates and in-app purchase updates) may be provided in a modules that comprise less than the entire application, while the application is rendered natively to provide the user experience (UX) preferred by end users.

In accordance with aspects of the invention, the application shell and virtual machine permit a single mobile application to be natively rendered on plural different mobile device platforms. Additionally, the modular implementation provides a cross-platform, natively rendered application with the following functionality:

(i) updates to the UX and/or core logic of the application are made within an update to the application that does not require a complete download of the full application;

(ii) the application is permitted to download specific modules of code through an online purchase or other enablement that allows the user to unlock functionality on the application, e.g., by purchasing the functionality and having the application update this functionality in real time without the purchase of an additional application;

(iii) new functionality is not part of the initial application, but rather is modular in nature and loadable by the already installed application; and (iv) the application supports progressive enablement during downloading, i.e., the application may expose some initial functionality while the application is being downloaded, such that the user may utilize the exposed functionality while the remainder of the application continues to download.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in the medium. The computer-usable or computer-readable medium is not a transitory signal per se, and is any tangible medium that can contain and store the program for use by or in connection with an instruction execution system, apparatus, or device.

Figure 1:
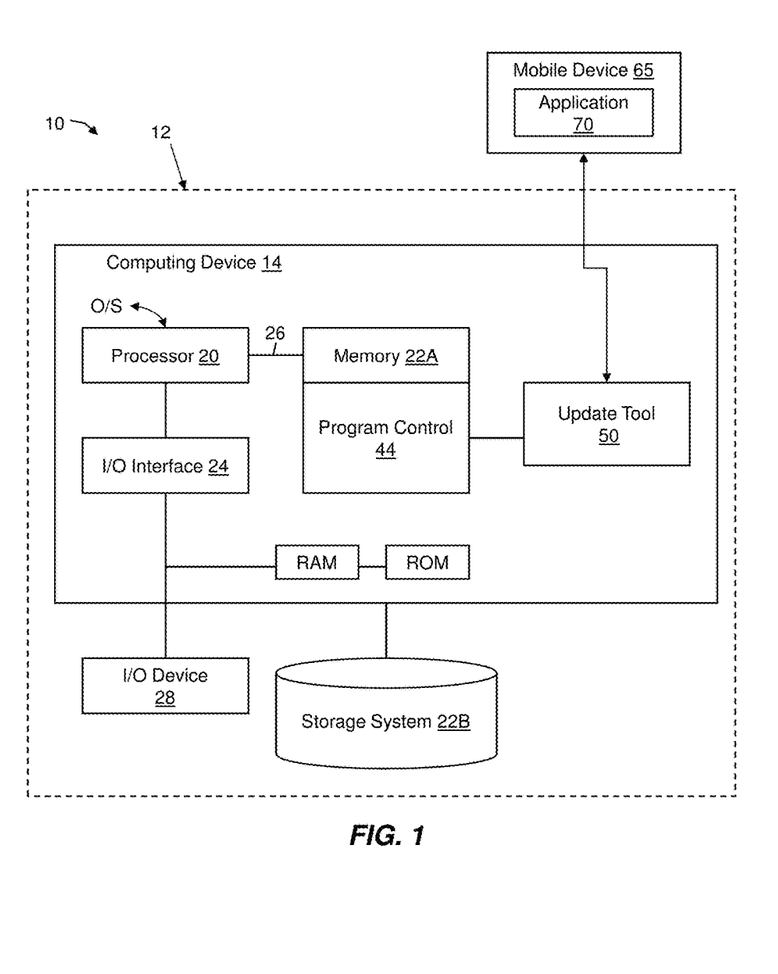
FIG. 1 shows an illustrative environment for managing the processes in accordance with the invention.

FIG. 1 shows an illustrative environment 10 for managing the processes in accordance with the invention. The environment 10 includes a server 12 or other computing system. The server 12 can be a business enterprise that stores data in a storage system 22B, which data may be accessed by users of mobile computer device 65. In embodiments, the server 12 can be a standalone server, which implements the processes of the present invention within a networking environment. That is, the server 12 and/or processes performed by the server 12 can be integrated into the networking environment of any enterprise.

The server 12 includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14. In addition, the computing device 14 includes a random access memory (RAM), a read-only memory (ROM), and an operating system (O/S). The computing device 14 is in communication with the external I/O device/resource 28 and a storage system 22B. The I/O device 28 can comprise any device that enables an individual to interact with the computing device 14 (e.g., user interface) or any device that enables the computing device 14 to communicate with one or more other computing devices (e.g., devices 65, etc.) using any type of communications link.

The processor 20 executes computer program code (e.g., program control 44), which can be stored in the memory 22A and/or storage system 22B. In embodiments, the program control 44 controls an update tool 50, which comprises a program that is adapted to perform one or more of the processes described herein. The update tool 50 can be implemented as one or more program code in the program control 44 stored in memory 22A as separate or combined modules. Additionally, the update tool 50 may be implemented as separate dedicated processors or a single or several processors to provide the functions described herein. While executing the computer program code, the processor 20 can read and/or write data to/from memory 22A, storage system 22B, and/or I/O interface 24. In this manner, the program code executes the processes of the invention.

According to aspects of the invention, the update tool 50 communicates with a mobile device 65 to provide updates (e.g., modules of code) to a natively rendered application 70 on the mobile device 65. As used herein, a mobile device refers to a smartphone, tablet computer, personal digital assistant, or similar computing device that includes a mobile operating system, wireless communication antenna, processor, user interface, memory, etc.

In embodiments, the update comprises code that provides a layout and/or instructional logic update to the application 70 that is already installed on the mobile device 65. In accordance with aspects of the invention, the update is not a complete application, as is the case with conventional updates of natively rendered applications; instead, the update is a module (e.g., a chunk of code) that is less than a complete application and that is utilized with (e.g., dropped in) the application 70 that already resides on the mobile device 65. In this manner, implementations of the invention provide a technical solution to the problem of natively rendered applications requiring complete applications be downloaded to update the application.

The update may be an in-app purchase module comprising code that adds functionality to the application 70 that is already installed on the mobile device 65. The added functionality may include special content or features, for example. In contrast with conventional methods for providing in-app purchases to natively rendered applications, the initially installed application 70 does not include programming that provides the functionality associated with the in-app purchase. Instead, in accordance with aspects of the invention, the programming that provides the functionality associated with the in-app purchase is delivered to the already-installed application 70 in an in-app purchase module from the update tool 50. In this manner, implementations of the invention provide a technical solution to the problem of natively rendered applications being disadvantageously large due to including code for in-app purchases even before the in-app purchase is effectuated.

The program code can include computer program instructions that are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

The computer readable storage medium comprises, for example, any non-transitory medium per se, such as electronic, magnetic, optical, electromagnetic, infrared, and/or semiconductor system. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

Figure 2:
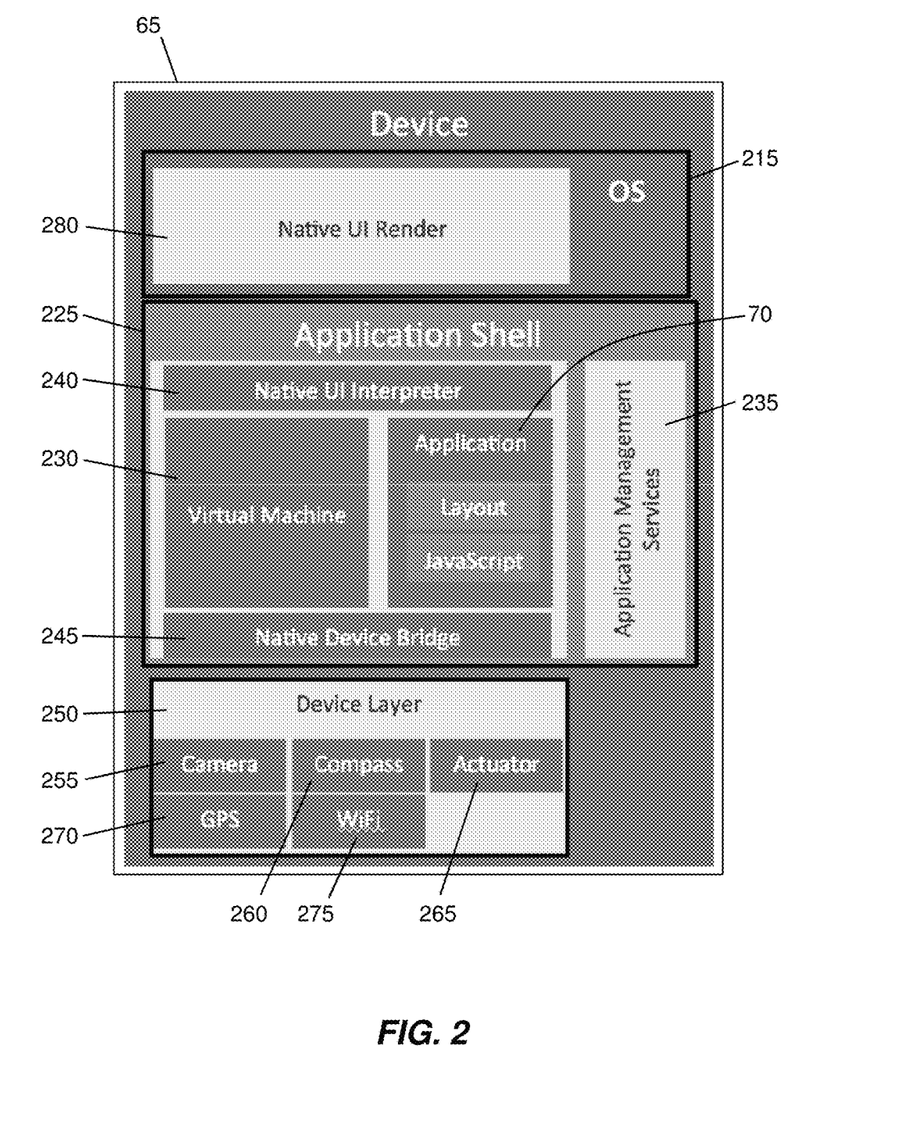
FIG. 2 shows a block diagram of components of a mobile device in accordance with aspects of the invention.

FIG. 2 shows a mobile device 65 in accordance with aspects of the invention. As described with respect to FIG. 1, the device 65 may comprise a smartphone, tablet computer, etc. The device 65 may comprise hardware including a processor, memory, display, user input device (e.g., touch screen, physical buttons), power supply (e.g., rechargeable battery), and at least one system for sending and receiving wireless communication signals (e.g., cellular, WiFi, Bluetooth, etc.). The memory may comprise RAM and internal storage that stores computer program code such as an operating system 215, application(s) 70, and other files and/or data. The processor executes computer program code stored in the memory to cause the device 65 to perform functions defined by the computer program code.

According to aspects of the invention, the computer program code stored in the memory of the device 65 includes an application shell 225 that causes the device 65 to natively render objects of an application 70 on the display of the device 65. In embodiments, the application 70 comprises a packaging of both visual assets (objects) and code (instructional logic) that is executed by a virtual machine 230 as described in greater detail herein. In one exemplary implementation, the application 70 is a published application that is intended for normal use by an end user. In another exemplary implementation, the application 70 is a prototype application that is in the development stage and that is intended for testing-based use by a tester.

Still referring to FIG. 2, in embodiments the application shell 225 is divided into components including: the virtual machine 230; an application management services tool 235; a native UI interpreter 240; and a native device bridge 245. As described herein, the application shell 225 is a natively written component (e.g., a program written in the native language if the operating system) that controls instantiation of the virtual machine 230. The application management services tool 235 manages the download of new modules (e.g., update modules and/or in-app purchase modules, which may comprise new layouts and/or control logic) of the application 70 that can be executed by the virtual machine 230, including synchronizing the modules into the application 70. The virtual machine 230 interprets the layout and control logic of the application 70. The native UI interpreter 240 converts layouts of the application 70 to native UX components as instructed by the virtual machine 230. The native device bridge 245 provides a bridge between the virtual machine 230 and a device layer 250 of the device 65, which bridge allows the virtual machine 230 to execute device level functionality, e.g., access and/or control one or more devices such as a camera 255, compass 260, actuator 265, GPS 270, and WiFi 275.

As described herein, the application shell 225 causes the application 70 to be natively rendered by the operating system 215, rather than being rendered by a web browser. For example, the application 70 may include a layout (e.g., a collection of objects displayed on the display of the device 65, such as buttons, fillable fields, boxes, tables, scrolls, etc.) that is defined using a non-native language, such as JavaScript or XML. In embodiments, the native UI interpreter 240 is programmed with interpretive mapping data that converts the application layout (objects) to native components that are defined using the native language of the operating system 215 and that are natively rendered by a native UI render component 280 of the operating system 215. The application shell 225 may be downloaded to the device 265 from a server, such as an app store implemented in the server 12 of FIG. 1.

Flow Diagrams

Figure 3:
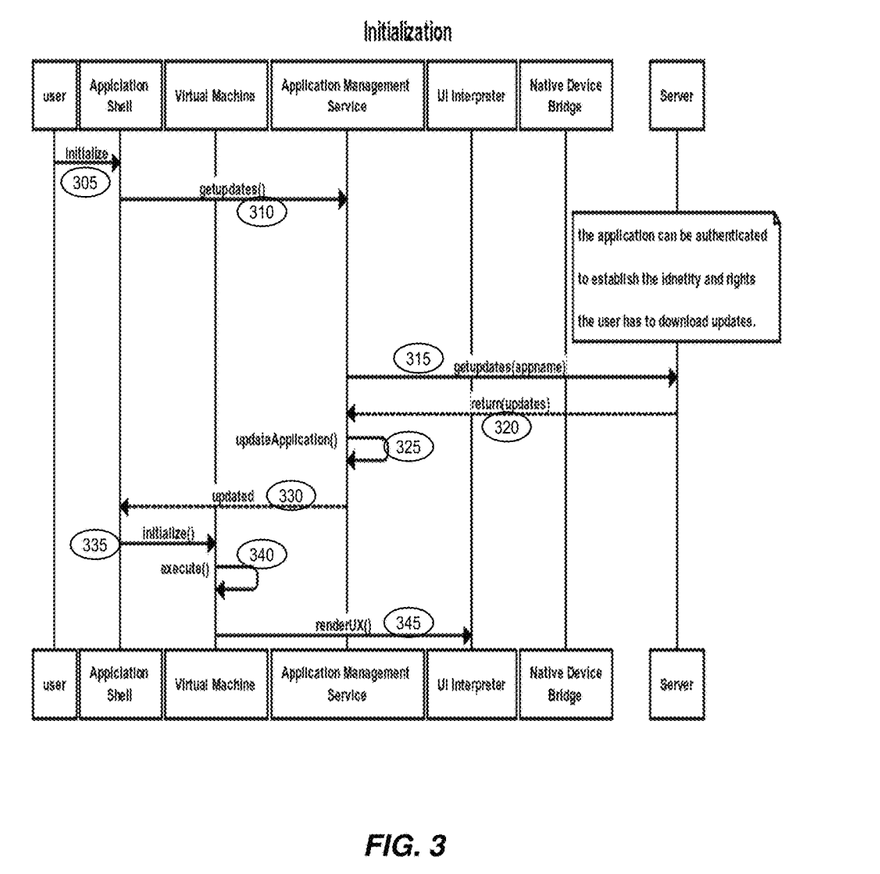
FIGS. 3 and 4 show flow diagrams of methods in accordance with aspects of the invention.
Figure 4:
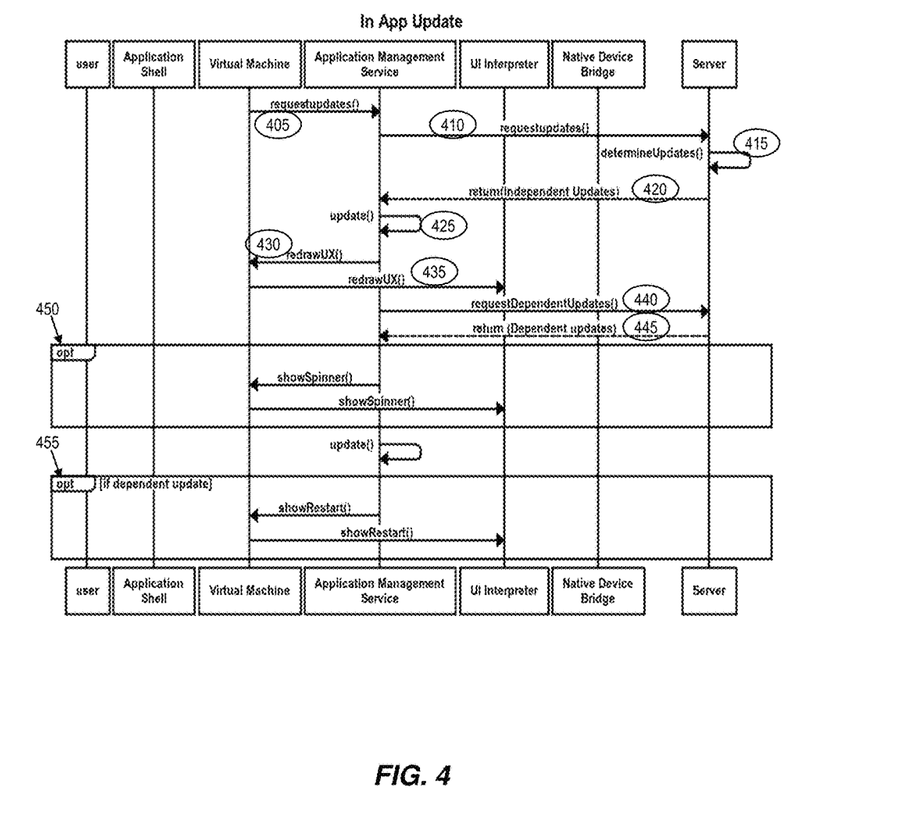

FIGS. 3 and 4 show flow diagrams (e.g., sequence diagrams or swim lane diagrams) implementing aspects of the present invention. The flow diagrams may equally represent a high-level block diagram or a swim-lane diagram of the invention. The steps of the flow diagrams may be implemented and executed, for example, from either a server, in a client-server relationship, or they may run on a user workstation with operative information conveyed to the user workstation. Furthermore, steps of the processes of the invention may be implemented using a computer-readable storage medium having program code for use by or in connection with a computer or any instruction execution system. The software and/or computer program product can be implemented in the environments of FIGS. 1 and 2.

As depicted in FIGS. 3 and 4, the server corresponds to the server 12 of FIG. 1 and may comprise, for example, an app store or a project server associated with an application prototyping tool. The application shell, virtual machine, application management service, native UI interpreter, and native device bridge depicted in FIGS. 3 and 4 correspond to the similarly named elements described with respect to FIG. 2 and that reside on the mobile device 65. The user depicted in FIGS. 3 and 4 corresponds to a human user of the mobile device 65.

FIG. 3 shows a flow diagram of providing an update to an application during initializing the application in accordance with aspects of the invention. More specifically, in the example of FIG. 3, at step 305 a user invokes an application (e.g., natively rendered application 70 installed on device 65) by providing a specific input to the device, such as tapping an icon that is associated with the application and that is displayed on the display screen of the device. The input from the user is communicated to and starts the application shell (e.g., application shell 225 that is associated with the application 70). When the application shell is started in this manner, at step 310 the application shell sends an update request to the application management service (e.g., application management service 235).

Based on receiving the update request, at step 315 the application management service sends a message to the server (e.g., server 12), the message including identifying information about the application. The identifying information may include, for example, the name of the application and the currently installed version application. For finer granularity implementations, the identifying information included in the message sent at step 315 may include a manifest of what modules and versions of modules of the application are currently installed on the mobile device (e.g., what module(s) the application is currently using). In embodiments, the application management service maintains a log of the data that is the subject of the message at step 315. For example, for coarse granularity implementations directed to versions of the application, the application management service may be programmed to store data that defines the version of the installed application. For finer granularity implementations directed to versions of modules within the application, the application management service may be programmed to store data that defines the modules and a respective version of each module. The message at step 315 may be sent from the device to the server using conventional communication methods, e.g., using cellular and/or WiFi communication between the device and the server.

Based on receiving the message from the application management service at step 315, the server determines which updates are to be sent to the application. For example the server may maintain a list of updates and/or versions (of the application or modules within the application), and may compare the data identified in the message from step 315 to the list of updates and/or versions. Based on the comparison, the server determines updates to be provided to the application, e.g., to bring the application into conformity with the list of updates and/or versions.

At step 320, the server sends the determined update to the application management service. In embodiments, the update is a package of code that includes a layout and/or instructional logic to be used with the application, but is not the complete (e.g., entire) application. The update may be written in a non-native language, such as XML or JAVASCRIPT (JS). The update may include an indication of code that already exists in the application that is to be overwritten using code contained in the update, as described with respect to step 325. The update at step 320 may be sent from the server to the device using conventional communication methods, e.g., using cellular and/or WiFi communication between the server and the device.

At step 325, the application management service updates the application using the update received from the server. In embodiments, the application management service overwrites one or more existing layouts and/or instructional logic of the application with the new layout and/or instructional logic contained in the update. Specifically, the application management service updates only a portion of the application, and does not replace the entire application. In the event that the application does not include a module, layout or logic designated to be overwritten by the update, the application management service creates the proper (necessary) files based on the update and places these files inside the application.

At step 330, after completing the update, the application management service notifies the application shell that the update is complete. At step 335, the application shell initializes the virtual machine (e.g., virtual machine 230) to execute the application. At step 340 the virtual machine executes the application. In embodiments, the executing the application includes reading the layout and/or instructional logic contained in the application. The executing the application may include executing the instructional logic, which may involve, e.g., receiving an input from the user and/or accessing a component (e.g., camera, compass, actuator, GPS, WiFi) through the native device bridge (e.g., native device bridge 245). While executing the application, the virtual machine sends rendering requests necessary for rendering the application to the native UI interpreter (native UI interpreter 240) as indicated at step 345. The native UI interpreter maps the rendering request to the native language of the OS of the device, and provides the mapped rendering data to the native UI rendering component of the OS. The native UI rendering component of the OS natively renders the layout of the application based on the mapped data received from the native UI interpreter. In this manner, the process depicted by the flow diagram in FIG. 3 permits providing modular updates to an already-installed, natively rendered application upon instantiation of the application on the mobile device.

FIG. 4 shows a flow diagram of providing an update to an application while the application is running in accordance with aspects of the invention. More specifically, the update process depicted in FIG. 4 occurs after the application has already been initialized and is running on the device, as opposed to providing the update during initialization as in FIG. 3. The update described with respect to FIG. 4 is referred to as a "live update" since it occurs while the application is presently running.

According to aspects of the invention, live updates are characterized as independent modules or dependent modules. An independent module is a module of code (e.g., layout and/or instructional logic) that can be added to the application while the application is running, which permits the user to continue using the application while the update occurs. A dependent module is a module of code (e.g., layout and/or instructional logic) that requires a restart of the application. Live updates, and in particular independent modules, are useful for in-app purchases and/or preloading an application and simultaneously adding new functionality to the application while the user is utilizing the application for other functionality. Although not illustrated in the sequence diagram in FIG. 4, each update can be sent individually from the server to the device, which allows a single module to be installed at a time. In this scenario, the server and the application management service keep track of which modules have been downloaded and installed during an update, and which modules remain to be downloaded and installed.

Still referring to FIG. 4, the sequence diagram depicts the series of events that happen when an update is invoked by the virtual machine while the application is running on the device. This may occur, for example, as part of a progressive update and/or an in-app purchase, as described herein.

At step 405, while the application is already being executed on the device, the virtual machine sends a request to the application management service to perform a live update. The virtual machine may send the request based on receiving a user input of an in-app purchase, for example.

At step 410, the application management service sends a message to the server requesting independent modules associated with the live update. At step 415, the server determines which modules are to be sent to the device. At step 420, the server sends an independent module to the application management service. At step 425, the application management service updates the application with the independent module while the application is still running on the device. In the example of an in-app purchase, after the purchase is made by the user the application is simply requesting the code from the server to add to the application. Since the application is interpreted (e.g., by the native UI interpreter), any independent modules downloaded as part of the live update can be loaded in the application without requiring a full restart of the application.

After updating the application with an independent module, the application management service may send an instruction to the virtual machine to redraw the display, as depicted at step 430. The redraw may be used for the purpose of updating the display based on the newly added independent module, e.g., to indicate to the user that an aspect of the in-app purchase is complete. At step 435, the virtual machine sends a redraw request to the native UI interpreter, which in turn maps the redraw request to the native language of the OS of the device and provides the mapped rendering data to the native UI rendering component of the OS. The native UI rendering component of the OS natively renders the layout of the application based on the mapped data received from the native UI interpreter. After step 435, if there are no dependent modules to be added by live update, the user may continue using the application (including the layout(s) and/or functionality provided by the newly added independent module) without re-starting the application. In this manner, live updates of independent modules may be used to progressively update a running application while permitting a user to continue using the running application including the layout(s) and/or functionality provided by the newly added independent modules as the independent modules are added to the application.

At step 440, after updating the application with any independent modules, the application management service sends a message to the server requesting any dependent modules associated with the live update. The server determines which dependent modules are to be sent to the device. At step 445, the server sends a dependent module to the application management service, which updates the application with the module.

In embodiments, independent modules are requested first before dependent modules. The server may be configured to send back a flag in the independent module to signal whether there are any dependent updates that require a full restart of the application. In the event that there are dependent modules to be loaded, the virtual machine may be configured to display a progress bar or spinner while the code is fetched from the server and the application is updated, as depicted at step 450. This may be the case when the logic of a current module being updated requires a restart or there are a group of dependent updates that need to all be installed before restart.

Optionally, a dependent module can be sent by the server with a flag that determines whether the module is dependent on a new install of the module, or whether the module is dependent on updating a module that already exists. This allows the application service to make a determination whether to send a restart instruction to the virtual machine, as depicted at step 455.

In both processes depicted in FIGS. 3 and 4, the updates (modules) are written in non-native language such as XML or JS. In this manner, a single update may be created by the application developer and deployed to plural different platforms having different operating systems. The native UI interpreter that resides in the application shell on a particular platform maps the layout of the update (module) to the native language of the operating system of the particular platform and then provides the mapped layout to the native UI rendering component of the OS to be rendered natively by the OS. In this manner, an update may be written once and sent to different devices and natively rendered on the different devices, instead of having to write a respective version of the update for each respective platform, which advantageously reduces development time of the update.

In accordance with aspects of the invention, the application may be a prototype application in a development stage prior to being published (released) to end users. For example, the application and updates (modules) may be created using an application prototyping tool such as that described in U.S. patent application Ser. No. 14/506,112, filed Oct. 3, 2014, the contents of which are hereby incorporated by reference herein in their entirety. For example, the application may be written by a developer using the application prototyping tool, published from the application prototyping tool to the server, and downloaded from the server to the mobile device of a test user (tester) for beta testing the layout and functionality of the application on the mobile device.

In the prototype application embodiment, the update (module) described with respect to FIGS. 3 and 4 may include a comment embedded by the developer. When the layout of the update is rendered on the display of the mobile device of the tester, the comment (e.g., text box) is displayed with the layout. In this manner, the developer may communicate comments about the layout to the tester, e.g., to alert the tester to pay close attention to particular features of the layout.

Additionally, the application shell may include programming logic that permits the tester to add a comment to any rendered layout and send the comment back to the developer via the server. For example, when viewing the layout of the display of the device during beta testing, the tester may provide an input to the device that causes the device to open (e.g., show) a comment field in the display. The layout may comprise an updated layout that is received at the device via an update as described with respect to FIG. 3 or 4. The input may comprise, for example, a two-finger tap or holding a single finger on an object of the displayed layout, which causes the device to open a comment field associated with that object of the layout. The tester may then type or voice-record a comment in the comment field. The application shell sends the comment to the server, and the developer using the application prototyping tool can access the comment from the server, which functions as a synchronization point between the application prototyping tool and the mobile device of the tester. In this manner, implementations of the invention provide the functionality of exchanging comments between the developer and a tester during prototyping of the application, which advantageously permits the developer and tester to collaboratively develop the application in real time.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method of providing an update to a natively rendered application installed on a mobile device, comprising steps of:
   sending a message to a server, wherein the message includes identifying information about the application installed on the mobile device;
   receiving an update from the server in response to the message, wherein the update comprises a module of code that corresponds to less than the entire application, wherein the update to the application does not require a complete download of the entire application;
   updating the application using the received update in a modular manner by:
      determining in the mobile device whether a subset of code exists in the application that is designated to be overwritten by the received update;
   if it determined that the subset of code exists, overwriting the subset of code in the application based on the received update without replacing the entire application; and
   if it is determined that the subset of code does not exist, creating new files to add inside the application, based on the received update, without replacing the entire application;
   executing the application after the updating; and
   based on the execution of the application, natively rendering the application using an operating system of the mobile device, wherein the steps are performed by an application shell installed on the mobile device, the application shell comprises code in a native language of the operating system.

2. The method of claim 1, wherein the identifying information about the application includes a name of the application and a currently used version of the application, and wherein the subset of code includes a module, layout and/or instructional logic designated to be overwritten by the update.

3. The method of claim 1, wherein the identifying information about the application includes a name of the application and a list of modules currently used by the application.

4. The method of claim 3, wherein the modules currently used by the application are modules that were applied to the application in other updates to the application.

5. The method of claim 1, wherein the module includes layout data and/or instructional logic used in executing the application.

6. The method of claim 5, wherein the module is non-native to the operating system of the mobile device.

7. The method of claim 6, wherein the module is written in XML or JavaScript.

8. The method of claim 1, wherein the sending the message to the server is performed during initialization of the application based on a user invoking the application.

9. The method of claim 1, wherein:
   the sending the message to the server is performed while the application is running after the application has been initialized; and
   the update comprises a live update.

10. The method of claim 9, wherein: the sending the message to the server is based on an in-app purchase performed in the application; and the module defines additional layout and/or functionality to the application based on the in-app purchase.

11. The method of claim 10, wherein, prior to the updating, the application is devoid of the code that defines additional layout and/or functionality.

12. The method of claim 9, further comprising:
   receiving an indication that the update is an independent update; and
   performing the executing the application after the updating without restarting the application.

13. The method of claim 12, further comprising, after the updating using the independent update, sending a message to the server requesting a dependent update.

14. The method of claim 12, further comprising performing the following steps simultaneously with the executing the application after the updating:
receiving an additional update from the server, and
updating the application using the received additional update.

15. The method of claim 9, further comprising:
receiving an indication that the update is a dependent update; and
restarting the application prior to the performing the executing the application after the updating.

16. The method of claim 1, wherein the message sent to the server includes a manifest of data regarding which modules or versions of modules of the application are currently installed on the mobile device, and an application management service of the mobile device maintains a log of data that is in the message.

17. The method of claim 16, wherein the server maintains a list of updates to compare to the data in the manifest to determine which updates to send to the mobile device.

18. A method of providing an update to a natively rendered application installed on a mobile device, comprising:
transmitting an application and an application shell associated with the application to a mobile device, wherein the application shell is configured to cause the mobile device to:
send a message to a server, wherein the message includes identifying information about the application;
receive an update from the server in response to the message, wherein the update comprises a module of code that includes layout data and/or instructional logic that is used in executing the application, wherein the update to the application does not require a complete download of the entire application;
update the application using the received update in a modular manner by:
determining in the mobile device whether a subset of code exists in the application that is designated to be overwritten by the received update;
if it determined that the subset of code exists, overwriting the subset of code in the application, based on the received update, without replacing the entire application; and
if it is determined that the subset of code does not exist, creating new files, to be added inside the application, based on the received update, without replacing the entire application;
execute the application after the updating;
based on the executing the application, natively render the application using an operating system of the mobile device, wherein the application and the update are composed of code in a language different from a native language of the operating system; and the application shell comprises code in a native language of the operating system.

19. The method of claim 18, wherein the message sent to the server includes a manifest of data regarding which modules or versions of modules of the application are currently installed on the mobile device, and an application management service of the mobile device maintains a log of data that is in the message.

20. The method of claim 19, wherein the identifying information about the application includes a name of the application and a currently used version of the application, and wherein the subset of code includes an existing layout and/or instructional logic designated to be overwritten by the update.

21. A computer system for providing an update to a natively rendered application installed on a mobile device, comprising:
a server computer that is structured and arranged to:
store an application and an application shell associated with the application;
transmit the application and the application shell to a mobile device;
receive a message from the mobile device, the message including identifying information about the application;
determine, based on the message, an update for the application; and
transmit the update to the mobile device,
wherein:
the update comprises a module of code that includes layout data and/or instructional logic that is used in executing the application on the mobile device, wherein the update to the application does not require a complete download of the entire application;
the application and the update are composed of code in a language different from a native language of an operating system of the mobile device; the application shell comprises code in a native language of the operating system of the mobile device;
the application shell causes the application to be natively rendered by the operating system of the mobile device based on executing the application after updating the application with the update in a modular manner; the application shell overwrites a subset of code of the application, if it exists in the mobile device, with the module of code without replacing the entire application; the message sent to the server includes a manifest of data regarding which modules or versions of modules of the application are currently installed on the mobile device, and an application management service of the mobile device maintains a log of data that is in the message, and when it is determined that a subset of code of the application, that is designated to be overwritten by the update, is not present in the mobile device, creating new files in the mobile device based on the update to be added inside the application based on the update, without replacing the entire application.

\* \* \* \* \*